Oct. 13, 1936.   J. J. WALTON   2,057,461
MOTOR VEHICLE LICENSE PLATE HOLDER
Filed April 4, 1935
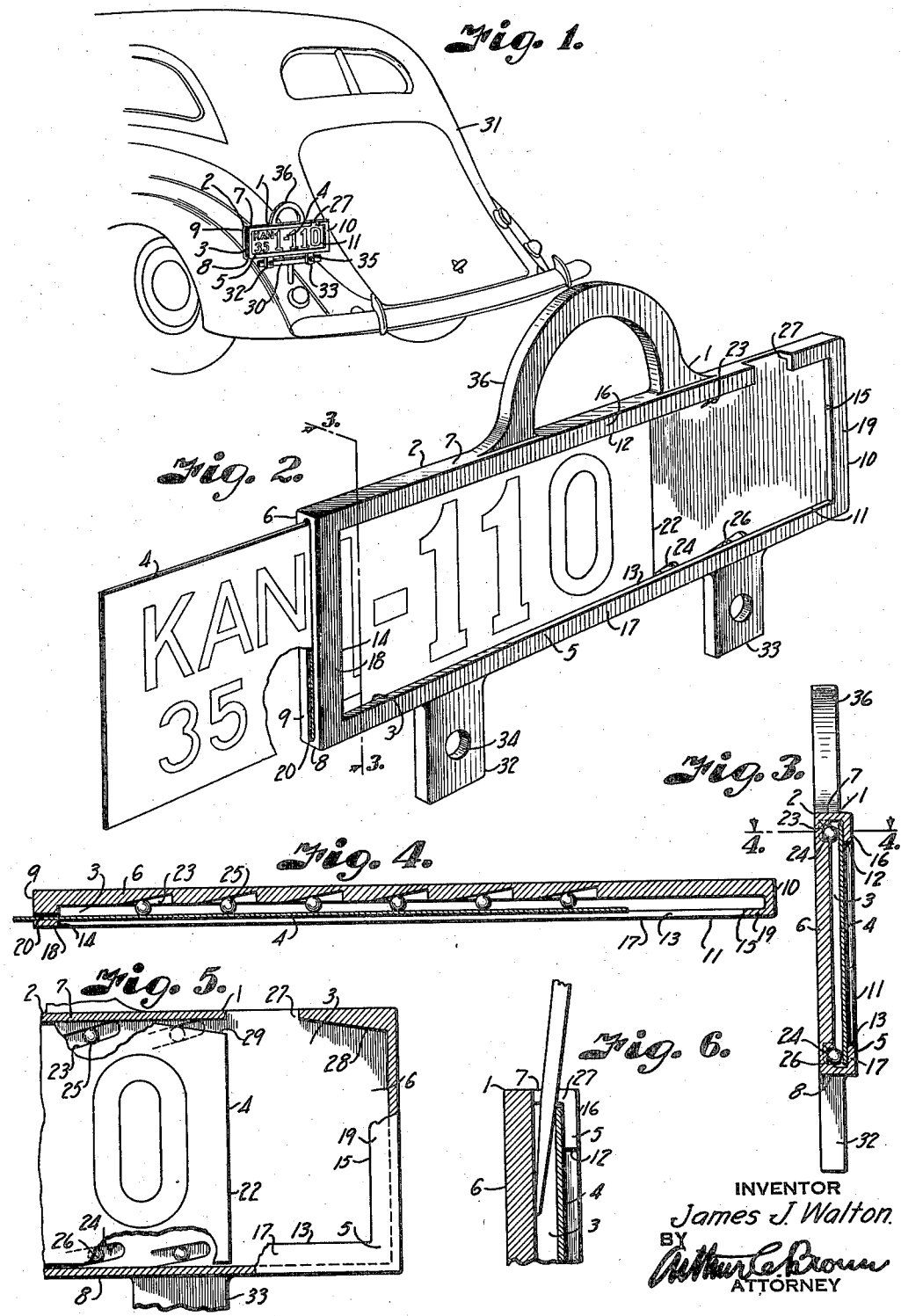
INVENTOR
James J. Walton.
BY
ATTORNEY Patented Oct. 13, 1936

2,057,461

UNITED STATES PATENT OFFICE 2,057,461

MOTOR VEHICLE LICENSE PLATE HOLDER

James J. Walton, Junction City, Kans.

Application April 4, 1935, Serial No. 14,617

10 Claims. (Cl. 40—125)

This invention relates to motor vehicle license plate holders, and has for its principal object to provide a holder of this character having means for preventing theft or removal of a license plate. Other important objects of the invention are to provide a holder wherein a license plate may be readily inserted without the aid of tools, to provide the holder with simplified gripping means to prevent retractive withdrawal of the license plate, and to provide the holder with means to permit insertion of a tool in such a manner as to effect mutilation of the plate incidental to removal thereof.

In accomplishing these and other objects of the invention as hereinafter pointed out, I have provided improved details of structure, the preferred form of which is illustrated in the accompanying drawing, wherein:

Fig. 1 is a perspective view of a vehicle equipped with a license holder embodying the features of my invention.

Fig. 2 is a perspective view of my improved holder showing the method of inserting a license plate therein.

Fig. 3 is a vertical section through the holder on the line 3—3, Fig. 2, particularly illustrating the latch means for preventing retractive removal of the license plate from the holder.

Fig. 4 is a horizontal section through the holder and license plate on the line 4—4, Fig. 3.

Fig. 5 is a detail view of the closed end of the holder, part of which is in section to show the license moving into position to engage the restricted portion of the holder, parts of the license plate being broken away to better illustrate the gripping elements.

Fig. 6 is a detail section illustrating the application of a tool for aiding in the removal and destruction of a license plate at the time a new plate is to be inserted.

Referring more in detail to the drawing:

1 designates a license holder embodying the features of the present invention and shown as including an elongated body portion 2 having a pocket 3 therein of suitable dimensions to accommodate the license plate 4. The holder is constructed of suitable material which is not subject to ready distortion or breakage, and includes front and rear plate portions 5 and 6 connected by integral longitudinally extending flanges 7 and 8 and end flanges 9 and 10 of sufficient width to form the desired depth of the pocket 3. The front plate portion 5 has a longitudinal window opening 11 to expose the face of the license 4. The window opening is of sufficient dimensions that the longitudinal edges 12—13 and the end edges 14—15 thereof overlap the edges of the plate to form longitudinal margins 16—17 and end margins 18—19. The end flange 9 is provided with a slotted opening 20 extending between the longitudinal flanges 7 and 8 and has one side edge thereof in the plane of the inner face of the front plate portion 5 as best illustrated in Fig. 4.

The opposite corresponding end flange 10 forms an abutment for the inner end 22 of the license plate when the license is connected within the holder.

In order to prevent retractive removal of the license plate from the holder the back plate portion thereof is provided on its inner face adjacent the longitudinal flange portions 7 and 8 with a series of upwardly inclined wedge shaped grooves or recesses 23 and 24 of sufficient width to loosely accommodate balls 25 and 26. The terminations of the grooves at the ends closest to the slot 20 are in the plane of the inner face of the back plate portion and the grooves incline upwardly and rearwardly away from the license plate to a greater depth at the ends thereof nearest the top and closed end of the holder to allow retractive movement of the balls when the license plate is inserted, the balls being of sufficient diameter that they are prevented from dropping out of the grooves when they gravitate to the shallow ends of the grooves and engage the inner face of the front plate portion 5 of the holder, or the rear face of the license plates as shown in Figs. 3, 4, and 5.

When the license plate is inserted into the slot 20 and pushed into the holder, the balls ride into the deeper portions of the grooves and permit free movement of the plate until the end 22 thereof engages the end of the pocket, whereupon the balls gravitate downwardly until stopped by the license plate. Should an attempt be made to retract the plate, the balls having rolled by gravity to the shallow end of the upwardly inclined grooves, frictionally urge the plate into gripped engagement between the inner face of the front face portion of the holder and the balls to prevent its removal.

It is thus apparent that when the plate is in position in the pocket it cannot be withdrawn through the slot. It may, however, be withdrawn through the window opening, but not without effecting destruction of the plate as now described.

In order to facilitate removal of the plate when a new license is to be inserted, one of the longitudinal flanges 7 or 8 and the adjacent marginal portion is provided with a notch 27 that is spaced inwardly from the end flange 10 of the holder as best shown in Fig. 1. The rear edge of the notch terminates in the plane of the front face of the rear plate portion 6 so as to permit insertion of a chisel therethrough as shown in Fig. 6 to engage against the license plate 4. Upon prying the chisel against the license plate in an outward direction, as shown in Fig. 6, the license is torn through the numbers thereon so that the license is only mutilated to prevent further use.

Attention is here directed to the fact that the series of latch balls terminate short of the notch to leave the portion of the license plate extending beyond the notch free of restraint by the latch means and it can therefore be moved retractively from under the overlying end marginal portion 19 of the holder.

Upon withdrawal of that end of the plate, the remaining portion of the license can be withdrawn in the direction of the flange 10 and through the window opening, the balls 25 moving to the deeper ends of the grooves to allow free sliding movement of the license against the front face portion of the holder as it is withdrawn.

After the license plate is removed, another license plate may be inserted in the same manner as the original and it, like the first, cannot be removed without such mutilation as to prevent its reuse.

In order to prevent an unauthorized person from removing the license by sawing off the end flange 10 and withdrawing the license from that end of the holder, the upper longitudinal flange 7 may be provided on its inner face with a downwardly inclined wedge portion 28 against which a correspondingly inclined portion 29 of the license engages so that even should the end flange 10 be removed it would still be impossible to withdraw the license plate without destruction thereof due to the wedging of the license plate against the wedge portion of the flange 7.

In order to attach the license holder to the supporting fixture 30 of the motor vehicle 31, the holder is provided with integral depending lugs 32 and 33 having apertures 34 therein for fastening devices such as rivets 35 that are extended therethrough and through aligning openings in the fixture 30.

In case the fixture 30 is formed as a part of the tail light of the vehicle, the license holder is provided with a loop 36 on the edge thereof opposite the lugs 32 and 33 to engage between the tail light and the fixture 30.

From the foregoing, it is apparent that I have provided a license holder wherein a license may be readily inserted without the use of tools, but which cannot be removed therefrom without destruction or mutilation of the license.

It is therefore impossible for an owner to buy one set of license plates and remove them from one vehicle and apply them to another vehicle, thereby defrauding the State. Likewise, the holder prevents theft of license plates by criminals and interchanging them with licenses on other vehicles.

What I claim and desire to secure by Letters Patent is:

1. In a holder of the character described, a body member having a pocket bounded by vertical ends and horizontal top and bottom edges and having a slot at a vertical end of the body member opening to said pocket for insertion of a license plate slidable horizontally in said pocket, said body member having a window opening of smaller size than the pocket to provide marginal portions overlapping the edges of the license plate, gravity actuated locking means carried by said body member for retaining the license plate in wedging contact with said marginal portions, and wedge means in the pocket for limiting horizontal projection of said plate into said pocket.

2. In a holder of the character described, a body member having a pocket bounded by vertical ends and horizontal top and bottom edges and having a slot at a vertical end of the body member opening to said pocket for insertion of a license plate slidable horizontally in said pocket, said body member having a window opening of smaller size than the pocket to provide marginal portions overlapping the edges of the license plate, and a series of gravity actuated locking means carried by said body member for urging opposite edges of the license plate in wedging contact with said marginal portions, one of said marginal portions having a notch at the end of the series of locking means opposite the slot to insert a tool for removing the lincense plate through said window opening.

3. In a holder of the character described, a body member having a pocket bounded by vertical ends and horizontal top and bottom edges and having a slot at a vertical end of the body member opening to said pocket for insertion of a license plate slidable horizontally in said pocket, said body member having a window opening of smaller size than the pocket to provide marginal portions overlapping opposite edges of the license plate and provided with wedge shaped recesses having bottoms sloping downwardly toward said license plate in the direction of said slot, balls normally retained in the lower ends of said recesses and movable to the opposite ends of the recesses upon insertion of the license plate in said pocket but returnable to the lower ends of the recesses upon retractive movement of the license plate to lock said license plate from withdrawal through said slot, and wedge means in the pocket for limiting horizontal projection of said plate into said pocket.

4. In a holder of the character described, a body member having a pocket bounded by vertical ends and horizontal top and bottom edges and having a slot at a vertical end of the body member opening to said pocket for insertion of a license plate slidable horizontally in said pocket, said body member having a window opening of smaller size than the pocket to provide marginal portions overlapping the edges of the license plate and provided with wedge-shaped recesses having bottoms sloping downwardly toward said license plate in the direction of said slot, and lock means normally retained in the lower ends of said recesses and movable to the opposite ends of the recesses upon insertion of the license plate in said pocket but returnable to the lower ends of the recesses upon retractive movement of the license plate to lock said license plate from withdrawal through said slot, one of said marginal portions having a notch at the end of the body member opposite the slot to insert a tool for removing the license plate through said window opening.

5. In a holder of the character described, a body member having a pocket bounded by vertical ends and horizontal top and bottom edges forming a pocket therebetween and having a slot at a vertical end of the body member opening to said pocket for insertion of a license plate slidable horizontally in said pocket, said body member having a window opening of smaller size than the pocket to provide marginal portions overlapping the edges of the license plate and provided with wedge-shaped recesses having bottoms sloping downwardly toward said license plate in the direction of said slot, latch balls normally retained in the lower ends of said recesses and movable to the opposite ends of the recesses upon insertion of the license plate in said pocket but returnable to the lower ends of the recesses upon retractive movement of the license plate to lock said license plate from withdrawal through said slot, one of said marginal portions having a notch at the end of the body member opposite the slot to insert a tool for removing the license plate through said window opening, and a wedge formed in said pocket at the end opposite said slot for engagement with the corresponding end of the license plate.

6. A holder of the character described, including a body member having spaced front and rear sides interconnected at their edges to form an intermediate pocket and having a slot in one of said connected edges for inserting an identification plate into said pocket, the front side having a window opening of smaller size than the pocket to form marginal edges cooperating with the rear side to engage the edges of the indentification plate, the rear side having wedge grooves inclined toward said slot, and gravity actuated means carried in said grooves for preventing retractive movement of the identification plate through said slot.

7. A holder of the character described, including a body member having a pocket bounded by vertical and horizontal top, bottom and end edges and having a slot in one of said edges for admitting an identification plate to said pocket, said body member having a window opening in its front face for exposing said plate, gravity actuated means carried by edges of said body member other than the top for locking said plate in said pocket, and wedge means in the pocket for limiting projection of said plate into the pocket.

8. A holder of the character described, including a body member having a pocket bounded by vertical ends and horizontal top and bottom edges and having a slot in one of said vertical ends for admitting an identification plate to said pocket, said body member having a window opening in its front face for exposing said plate, and gravity actuated means carried by the horizontal top and bottom edges of said body member for locking said plate in said pocket.

9. A holder of the character described, including a body member having a pocket bounded by vertical ends and horizontal top and bottom edges and having a slot in one of said vertical ends for admitting an identification plate to said pocket, said body member having a window opening in its front face for exposing said plate, gravity actuated means carried by a horizontal edge of said body member for locking said plate in said pocket, and wedge means in the pocket for limiting projection of said plate into said pocket.

10. A holder of the character described, including a body member having a pocket bounded by vertical ends and horizontal top and bottom edges and having a slot in one of said vertical ends for admitting an identification plate to said pocket, said body member having a window opening in its front face for exposing said plate, gravity actuated means carried by the horizontal top and bottom edges of said body member for locking said plate in said pocket, wedge means in the pocket for limiting projection of said plate into the pocket, and fastening means carried by said body member for securing same to an object to be identified.

JAMES J. WALTON.